March 9, 1971 F. LUNN 3,568,247
MOLDING MACHINE
Filed Aug. 7, 1968 4 Sheets-Sheet 1

INVENTOR
FRANK LUNN
By Nilsson & Robbins
ATTORNEYS

March 9, 1971 F. LUNN 3,568,247
MOLDING MACHINE
Filed Aug. 7, 1968 4 Sheets-Sheet 2

INVENTOR
FRANK LUNN
BY Nilsson Robbins
ATTORNEYS

March 9, 1971

F. LUNN 3,568,247

MOLDING MACHINE

Filed Aug. 7, 1968

INVENTOR
FRANK LUNN

BY Nilsson & Robbins
ATTORNEYS

March 9, 1971  F. LUNN  3,568,247

MOLDING MACHINE

Filed Aug. 7, 1968  4 Sheets-Sheet 4

INVENTOR
FRANK LUNN

BY Nilsson + Robbins
ATTORNEYS

United States Patent Office 3,568,247
Patented Mar. 9, 1971

3,568,247
MOLDING MACHINE
Frank Lunn, South Pasadena, Calif., assignor to Spectrol Electronics Corporation
Filed Aug. 7, 1968, Ser. No. 750,906
Int. Cl. B29c 3/00
U.S. Cl. 18—5                                  8 Claims

ABSTRACT OF THE DISCLOSURE

A molding machine for encasing electrical components. A rotatable platform is provided with oppositely disposed platens containing a plurality of mold cavities. The platens are spaced so as to be rotated simultaneously and respectively into and out of a loading station and a molding station. Each cavity is adapted to securely receive and readily eject electrical components. Means are also provided for urging encasing material from a central location on each platen into each cavity.

BACKGROUND OF THE INVENTION

(1) Field of the invention

The field of art to which the invention pertains includes the field of molding devices.

(2) Description of the prior art

A wide variety of miniature electrical components are known to the art. Such devices are generally sealed from the ambient atmosphere to preclude the entry of foreign contaminants which might interfere with their mechanical or electrical functions. Effectively sealing devices that require access to an internal part has been a serious problem. For example, variable resistors and potentiometers require movable selection means exteriorly of the housing but connected interiorly thereof. The housings of such devices have traditionally been made of several parts which are brought together and bonded by adhesive. Such constructions require much hand assembly operation which not only increases the cost of manufacture of such devices but also, in many instances, lowers the quality thereof.

SUMMARY OF THE INVENTION

The present invention enables the formation in one piece of a housing for small electrical components wherein a portion of the component is exposed through the housing, but the perimeter of such exposed portion is tightly encased by the housing. Specifically, a molding machine is provided including a platen having a mold cavity therein for receiving a small electrical component and forming a mold thereabout. A facing surface is associated with the cavity and means are provided urging the portion of the electrical component that is to be exposed through the housing into engagement with such facing surface to prevent encasing material from adhering to such portion. In one embodiment, the facing surface comprises the contacting surface of an overlying mold plate. In another embodiment, the facing surface comprises a side wall of the cavity.

In other specific embodiments, the floor of the cavity constitutes the top surface of a member that is slidable within the cavity and means are provided urging the slidable member into the cavity so as to fill a substantial portion thereof in the absence of a component being placed therein. Shafts are located in the cavity floor to accommodate electrical leads from the components and means are provided which can be actuated to urge such leads out of the shafts to eject the component after molding has been accomplished.

In another embodiment, a plurality of such cavities are provided in at least two platen regions of a rotatable platform. A loading station and a molding station are provided associated with the rotatable platform so that one of the platen regions is at the molding station when another of the platen regions is at the loading station. Means are provided at the molding station for urging encasing material into the cavities of the platen region thereat. Means are also provided for rotating the platform to simultaneously bring one platen region out of the molding station and the other platen region out of the loading station. In particular embodiments, two platen regions are oppositely disposed on the platform so that rotation of the platform brings one platen region from the molding station into the loading station and simultaneously brings the other platen region from the loading station into the molding station. Molded components can be unloaded by means provided at the loading station for that purpose.

In still another embodiment of the invention, each platen has depressions in its surface to form a pocket, for containing encasing material, and to form channels from the pocket to mold cavities. Means are provided engaging the surface of the platen to substantially enclose the cavities and channels (which means may also constitute the above-noted facing surface) and means are provided for urging the encasing material from the pocket into the cavities during a molding operation. A gated passageway of substantially reduced cross section is formed at the interception of each channel with its respective cavity. Heating means are associated with each platen and a ram is associated with the noted surface engaging means to enclose the pocket whereby a solid pellet of the encasing material in the pocket can be melted by the heating means and urged by the ram into the cavities.

DESCRIPTION OF THE PREFERRED EMBODIMENTS

Figure 1:
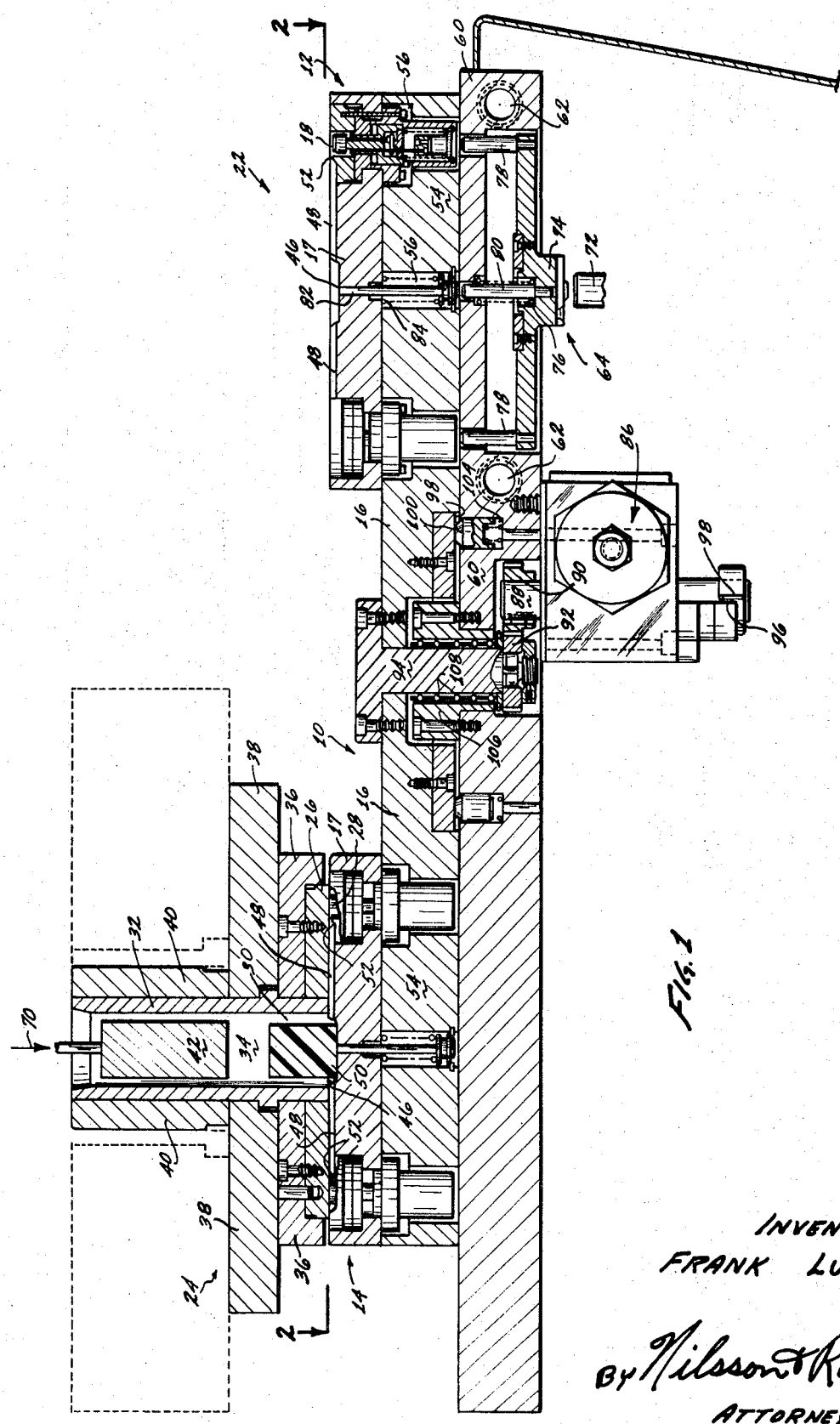
FIG. 1 is a cross-sectional side view of the basic components of a molding machine of this invention.
Figure 2:
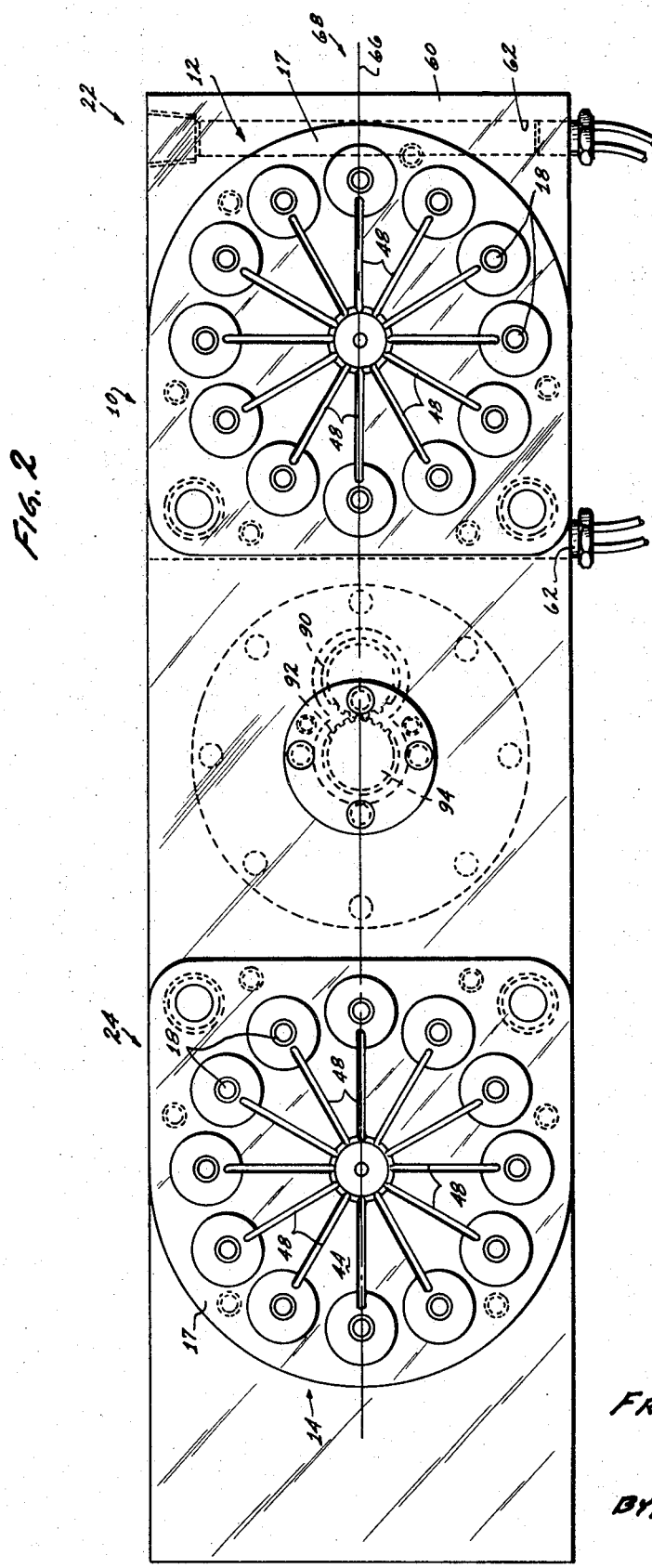
FIG. 2 is a plan top view of the lower half of the machine of FIG. 1 taken on the line 2—2 thereof in the direction of the arrows.

Referring to FIGS. 1 and 2, the basic molding machine comprises a table 10 which has two positions or platens 12 and 14 interconnected by a central area 16. Each of the two platens 12 and 14 comprises a lower mold plate 17 having a plurality of mold cavities 18 therein. One platen 12 is shown at a loading station 22 while the other platen 14 is shown at a molding station 24.

At the molding station 24, an upper mold plate 26 is provided having a facing surface 28 the purpose of which will be amplified below. The upper mold plate 26 is provided with a centrally located aperture 30 therein into which is secured a tubular member 32 forming a cylindrical chamber 34 centrally disposed over the platen 14 at the molding station 24. The upper mold plate 26 is built up in width, height and weight by a variety of cylindrical members 36, 38 and 40 secured along the length of the tubular member 32, so as to add weight to the upper mold plate and rigidity to the tubular member 32. A ram 42 is disposed within the cylindrical chamber 34 of the tubular member 32, for purposes to be described below. Means are provided (not shown) for raising and lowering the lower mold plate 17 with respect to the upper mold plate 26.

The top surface 44 (FIG. 2) of each mold plate 17 has depressions therein forming a centrally disposed pocket 46 and channels 48 from the pocket 46 to each of the mold cavities 18. The pocket 46 is to contain a pellet 50 of heat setting plastic which, when under pressure and heated to melting, flows through the channels 48 and into the mold cavities 18. Referring specifically to FIG. 1, the depth of depression of each of the channels 48 is substantially decreased at the interception with its respective cavity 18 to form a gated passageway 52 of substantially reduced cross section thereat to control the passage of encasing material from the pellet 50.

Each platen 12, 14 comprises a lower mold plate 17 overlying an end portion 54 of the table 10. The end portions 54 are provided with a plurality of chambers 56 that underlie the mold cavities 18 and with a centrally located chamber 58 for purposes which will be described below. Underlying each end portion 54 is a substructure 60 to which are affixed a pair of electrically controlled heaters 62 (shown in shadow in FIG. 1). The chambers 56 and 58 house loading and ejection apparatus and the substructure 60 has an ejection mechanism 64, disposed therein and alignable with the mechanisms of the chambers 56 and 58 as further described below.

In general terms, the apparatus is operated as follows. An operator positioned along the centerline 66 of the device and substantially at the position marked 68, loads an electrical component into each of the mold cavities 18. A pellet of plastic encasing material 50 is placed in the central pocket 46 therefor and the apparatus is rotated through a 180° arc so that the lower mold plate 17 is positioned in the molding station 24 with components in place. At that point in time, the lower mold plate 17 and associated cylindrical members are in a lowered position sufficiently distant from the upper mold plate 26 to allow the loaded lower mold plate 17 to be swung into place in the molding station 24. Subsequently, the lower mold plate 17 assembly is raised so that its facing surface 44 abuts the bottom surface 28 of the upper molding plate 26 and by such abutment encloses the channels 48 and pockets 18 to form conduits of such channels 48. When thus in the molding station 24, the ram 42 enters the cylindrical chamber 34 and moves downwardly as indicated by the arrow 70 to compress the pellet 50. Heat is applied by the heaters 62. Under the pressure thus applied and heat of the table 10, the plastic 50 becomes fluid and passes through the conduits formed by the channels 48, through the gated passageway 52 and into the cavities 18 to thereby provide an outer encasing housing for each of the components. Heat is maintained until the plastic has set and becomes solid.

Simultaneously with the foregoing molding operation, the operator fills each of the cavities 18 of the lower mold plate 17 in the loading station 22. In this particular case, each lower mold plate 17 has twelve mold cavities 18. The heat and pressure applied at the molding station is such that when the operator has utilized a reasonable time to load the electrical components into the twelve mold cavities 18 at the loading station 22, automatic cycling rotates the table 10 to place the newly loaded lower mold plate 17 within the molding region 24 and to bring the molded components out of the mold region 24 and into the loading station 22.

The loading station 22 also serves as the ejection station and includes hydraulic ram means (not shown) which actuates a ram rod 72 which in turn abuts and moves a platform 74 which is spring loaded downwardly from the substructure 60 by a spring 76. Upward movement of the platform 74 carries with it a plurality of actuating rods 78, which function to eject the components from the mold cavities 18 as will be described further below, and also carries an ejection rod 80 which in turn abuts and urges upwardly an ejection pin 82 that is spring biased downwardly by a spring 84 thereabout. The ejection pin 82 dislodges residual plastic material adhering to the pocket 46 and channels 48.

Rotation of the table 10 is preferably automatic and timed, as indicated, so that optimum operator time is utilized, resulting in great efficiency of operation. Any of a variety of methods for automtic rotation can be utilized and the use of electrically actuated hydraulic rams to both rotate the table and actuate the ejection mechanism 64 is particularly suitable. Alternatively, a high degree of efficiency can still be maintained if only a portion of the procedure is automated. Thus, the operator loading the apparatus can control the time of rotation and, after all mold cavities 18 have been loaded, he need merely press a button to electrically actuate hyrdaulic rams to rotate the table 10. Such an arrangement is illustrated in FIG. 1 where a hydraulic ram is shown generally at 86, the movement of which moves a rack and associated gearing 90. Rotation of the gearing 90 rotates gearing 92 which is connected to and turns the shaft 94 that is fixed to the central portion 16 of the table 10. Movement of the hydraulic ram is controlled by limit switches, e.g. 96, responsive to a cam plate 98, or other known limit mechanism, so that the table 10 oscillates from one position to another rather than rotates; however, means for simple rotation may also be utilized if suitable alignment mechanisms are provided. Bearing surfaces 98 are centrally provided on the under side of the table 10 overlying a plurality of bearing cylinders 100 suspended by springs 102 within pockets 104 therefor in the substructure 60. Another bearing surface 106 engages the central shaft 94 by means of roller bearings 108. Rotation of the central shaft 94 thus enables the table 10 to be rotated over the substructure 60.

Just prior to rotation of the table 10, the lower mold plate 17 is separated from the upper mold plate 26 by the lowering of the table 10 therefrom.

Figure 3:
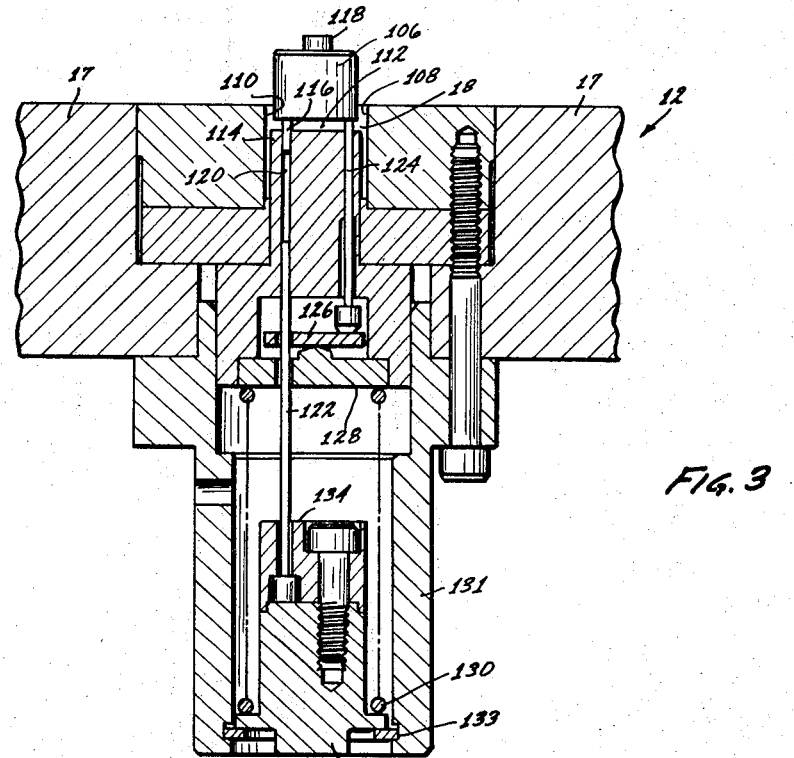
FIG. 3 is a cross-sectional side view of a single mold cavity of this invention, prior to insertion of a component therein.
Figure 4:
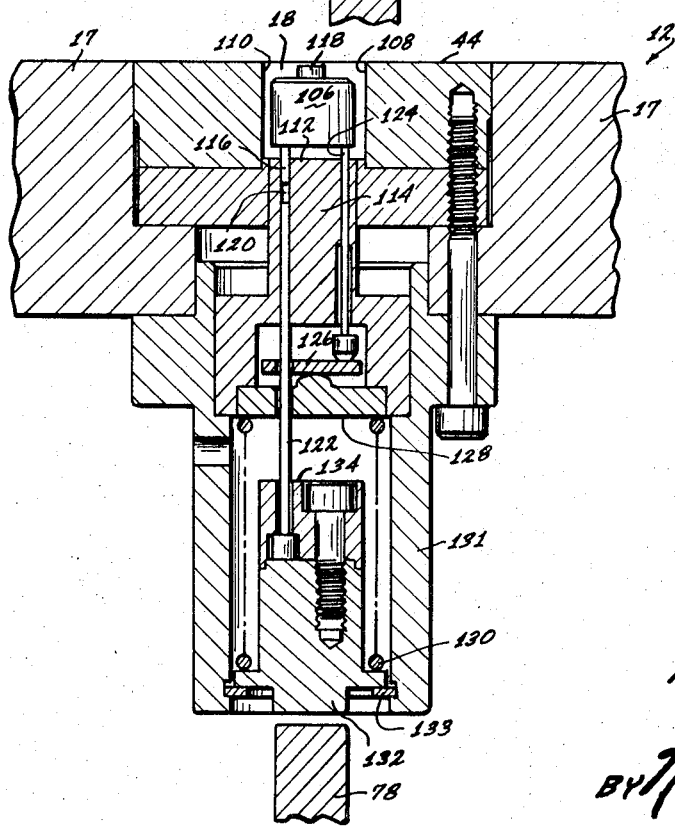
FIG. 4 is a cross-sectional side view of the mold cavity of FIG. 3 after insertion of a component and illustrating a component seated therein.

Referring to FIGS. 3 and 4, cross-sectional views are shown of a single mold cavity 18 within a lower mold plate 17, and underlying structure therefor. FIG. 3 depicts the mold cavity 18 with a portion of the underlying structure extended into the mold cavity, prior to loading thereof with an electrical component. FIG. 4 depicts the mold cavity having an electrical component 106 situated therein. As is illustrated in FIG. 3, a mold cavity 18 is provided having side walls 108 and 110. A floor of the cavity is defined by the top surface 112 of a slidable member 114 disposed within the mold cavity 18. The slidable member 114 extends well into the mold cavity 18 in its normal position (FIG. 3); that is when unoccupied by an electrical component 106, and in such position occupies a large proportion of the space of such cavity 18.

Referring specifically to FIG. 4, each electrical component 106 is provided with a number of electrical leads, one of which 116 is illustrated, and each component 106 has a portion 118 thereof to be exposed through the housing to be molded thereabout. The slidable member 114 has a plurality of shafts, one of which 120 is shown, extending therethrough from its top surface 112 and corresponding in size, number and position to the electrical leads 116 extending downwardly from the electrical component 106 when such component 106 is seated within the mold cavity 18. An ejection pin 122 extends into the shaft 120 from the bottom of the slidable member 114 for purposes to be described. A plurality of spacer pins, one of which 124 is shown, extend through the slidable member 114 and upwardly from the surface 112 thereof. A wobble plate 126 maintains the spacer pins 124 in alignment with each other and with the ejection pins 122 which extend therethrough.

To load the mold cavity 18, the operator places an electrical component 106 thereon with its leads 116 extending downwardly into the shafts 120 therefor in the slidable member 114. In this embodiment, the portion 118 of the component that is to be exposed faces upwardly and the dimensions of the cavity 18 are such that such portion 118 is flush with the top surface 44 of the lower mold plate 17, when the upper mold plate 26 is in position, and yet there is sufficient space between the bottom surface of the component 106 and top surface 112 of the slidable member 114 to allow adequate encasing material thereat.

After the mold cavities 18 have been loaded with electrical components 106, as in FIG. 4, a pellet 50 of plastic encasing material is placed in the pocket 46 (FIGS. 1 and 2) and the entire assembly is rotated through a 180° arc, as above, so that the lower mold plate 17 is positioned in the molding station 24. The upper mold plate 26 (FIGS. 1 and 2) is lowered until the facing surface 28 thereon abuts the top surface 44 of the lower molding plate 17. The slidable member 114 has a lower surface 128 abutting a spring 130, within a housing 131 therefor, that biases the sliding member 114 upwardly and which presses the portion 118 of the component to be exposed against the smooth, flat facing surface 28 of the upper mold plate 26.

As previously described, and referring back to FIGS. 1 and 2, a ram 42 is urged against the pellet 50 and heat is applied thereto by means of the heaters 62. Pressure is continued until the plastic melts and spreads through the channels 48, past the gated passageways 52 and into the mold cavities 18 to encase the component 106 therein within a housing of plastic. After sufficient time has elapsed to allow the plastic to set, as is known in the art (during this time the oppositely disposed lower mold plate 17 is being unloaded and then reloaded), the table 10 is again rotated in a 180° arc back to its original position. As noted, an ejection pin 122 extends through the lower part of the slidable member 114 in each of the lead shafts 120 therethrough. Plastic encasing materials sometimes may flow not only around the electrical component 106 but also around each of the electrical leads 116 in each of these shafts 120. The ejection pins terminate within a movable lower member 132 which is configured and positioned to be biased downwardly against a retaining snap ring 133, held in a groove in the spring housing 131, by the spring 130 and biases upwardly the sliding member 114. The bottom of the slidable lower member 132 is positioned overlying the hydraulically actuated actuating rod 78. As the actuating rod 78 moves upwardly, it urges the movable lower member 132 upwardly until its upper surface 134 abuts the lower surface 128 of the slidable member 114. During this initial movement, the spring 130 is compressed and the ejection pins 122 move upwardly through the shafts 120 in the slidable member 114 and thereby push the electrical leads 116 out of the shafts 120. At the same time, the spring 130 urges the slidable member 114 upwardly to lift the encased component 106 out from the mold cavity 118. The effective result is that the finished components 106 are totally ejected from the mold cavities 18. Upon the ram rod 72 being retracted, the spring 130 returns the slidable member 114 to the position illustrated in FIG. 3.

Figure 6:
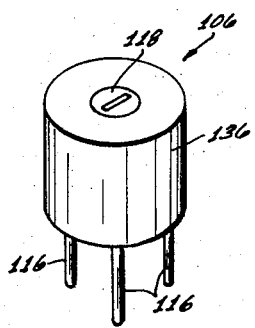
FIG. 6 is a perspective view of an encased electrical component obtained from the mold cavity of FIGS. 3 and 4.

Referring to FIG. 6 a component 106 is illustrated encased in a housing 136 molded in accordance with the above procedure and having a notched portion 118 thereof exposed through the housing and having electrical leads 116 extending therefrom. By this invention, one obtains access internally of the housing 136 by means of the exposed portion 118 and yet the components within the housing 136 are insulated from the ambient atmosphere.

Figure 5:
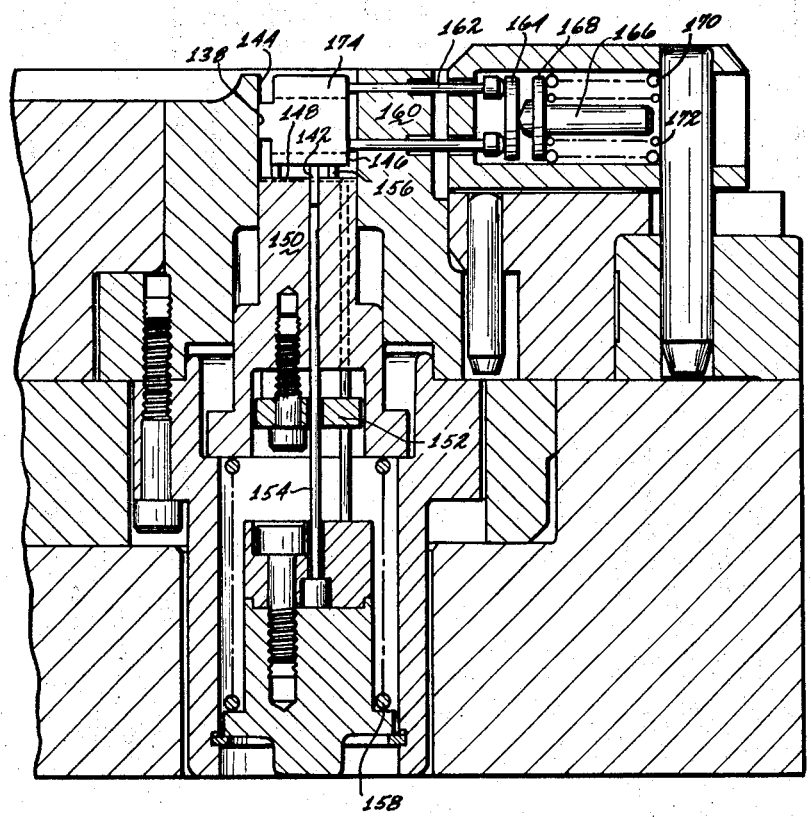
FIG. 5 is a cross-sectional side view of the mold cavity of an alternative embodiment of this invention.
Figure 7:
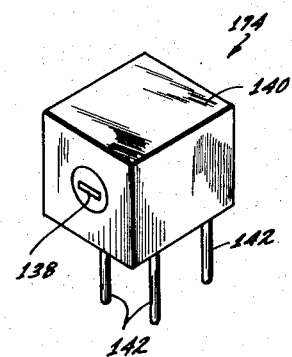
FIG. 7 is a perspective view of an encased electrical component obtained from the mold cavity of FIG. 5.

Referring to FIG. 5, an alternative configuration for the mold cavity and associated structure is shown which is utilized to produce encased components as illustrated in FIG. 7. The previous description with reference to FIGS. 3, 4 and 6, related to encasing components having an exposed portion 118 disposed oppositely to the electrical leads 116. With respect to the device of FIG. 7 the portion 138 to be exposed through the housing 140 is laterally disposed with respect to the electrical leads 142. Accordingly, if the component were to be placed in the mold cavity 118 illustrated in FIGS. 3 and 4, with the electrical leads inserted in the shafts 120 therefor, the portion 138 to be exposed would actually be covered by the encasing material.

The configuration and structure utilized by the device of FIG. 5 provides a facing surface 144 on one side of a cubiform mold cavity 146, the facing surface 144 being laterally disposed with respect to the floor 148 of the cavity. The floor 148 is defined by the top surface of a slidable member 150 generally similar to the slidable member 114 of FIGS. 3 and 4 but having a centering plate 152 disposed thereunder, in place of the wobble plate 126, to maintain ejection pins 154 and spacing pins 156 in alignment. The slidable member 150 is biased upwardly by a spring 158 in a manner identical to that of the configuration of FIGS. 3 and 4 to urge the sliding member 150 into the mold cavity 146 in the absence of a component therein. The mold cavity wall 160 opposite the facing surface 144 thereof is provided with spacing pins 162 extending therethrough and abutting on the opposite side of the wall 160 a wobble plate 164. The wobble plate 164 is biased toward the mold cavity 146 by a bias rod 166 and associated plate 168 which in turn are urged forward by a biasing spring 170 and centering spring 172.

In operation, the mold cavity of FIG. 5 is loaded, as before, with a component 174 having electrical leads 142 extending downwardly into shafts 176 in the slidable member 150 therefor. The component 174 is urged against the facing surface 144 by the force of the springs 170 and 172 via the spacing pins 162 so that the portion 138 to be exposed is tightly abutting the facing surface 144 and forms a seal thereat against the casing material. After the components 174 are positioned within the cavities 146, the table 10 is rotated as before and molding accomplished in the same manner as previously described to obtain an encased component as illustrated in FIG. 7.

What is claimed is:

1. A molding machine for encasing within a housing of electrically non-conductive material, an electrical component having a portion to be exposed through said housing, comprising:
    a platen including walls defining a mold cavity for receiving said component to form a mold thereabout;
    a facing surface associated with said cavity; and
    means movable into said cavity for urging said component portion into engagement with said facing surface to prevent encasing material from adhering to said portion.

2. The machine of claim 1 wherein said facing surface constitutes a side wall of said cavity.

3. A molding machine for encasing within a housing of electrically non-conductive material, an electrical component having a portion to be exposed through said housing, comprising:
    a platen having a mold cavity therein for receiving said component to form a mold thereabout;
    a facing surface associated with said cavity;
    means urging said component portion into engagement with said facing surface to prevent encasing material from adhering to said portion;
    a surface within said cavity defining a floor thereof;
    at least one shaft through said floor surface to contain an electrical lead from said component when said component is seated within said cavity; and means which can be actuated to urge said lead out of said shaft.

4. The machine of claim 3 wherein said cavity floor constitutes the top surface of a member slidable within said cavity, and including means urging said slidable member into said cavity so as to fill a substantial portion thereof in the absence of a component therein.

5. The machine of claim 3 wherein said actuatable means comprises a rod slidable within said shaft to displace said lead therefrom.

6. The machine of claim 1 including spacing members extended movably through one of said walls into said cavity for abutting a surface of said component to provide space for encasing material between said one wall and said component surface and means for aligning said spacing members.

7. A molding machine for encasing within a housing of electrically non-conductive material, an electrical component having a portion to be exposed through said housing, comprising:

a platen having a mold cavity therein for receiving said component to form a mold thereabout;

a member slidable within said cavity and having a top surface defining substantially the entire floor of said cavity; and means urging said slidable member into said cavity so as to fill a substantial portion thereof in the absence of a component therein.

8. A molding machine for encasing each of a plurality of components, comprising:

a platen containing a plurality of mold cavities for said components and having a surface defining a pocket for containing encasing material for said components and channels from said pocket to said cavities;

means engaging said surface of said platen to substantially enclose said cavities and channels;

means for urging encasing material from said pocket into said cavities; and a member for each of said cavities which is slidable into said cavity and which has a top surface defining substantially the entire floor thereof, and including means urging said slidable member into said cavity so as to fill a substantial portion thereof in the absence of a component therein.

References Cited

UNITED STATES PATENTS

| 2,830,323 | 4/1958 | Krebs et al. | 18—20(S) |
| 3,213,490 | 10/1965 | Johnson | 18—30(PU) |
| 3,268,645 | 8/1966 | Stampfli | 18—42(D) |
| 3,371,377 | 3/1968 | Budzich et al. | 18—5(E) |

H. A. KILBY, JR., Primary Examiner